Aug. 13, 1935.   H. M. COULSON   2,010,980
AUTOMATIC SHUTTERS FOR WATER COOLING TOWERS
Filed March 29, 1932
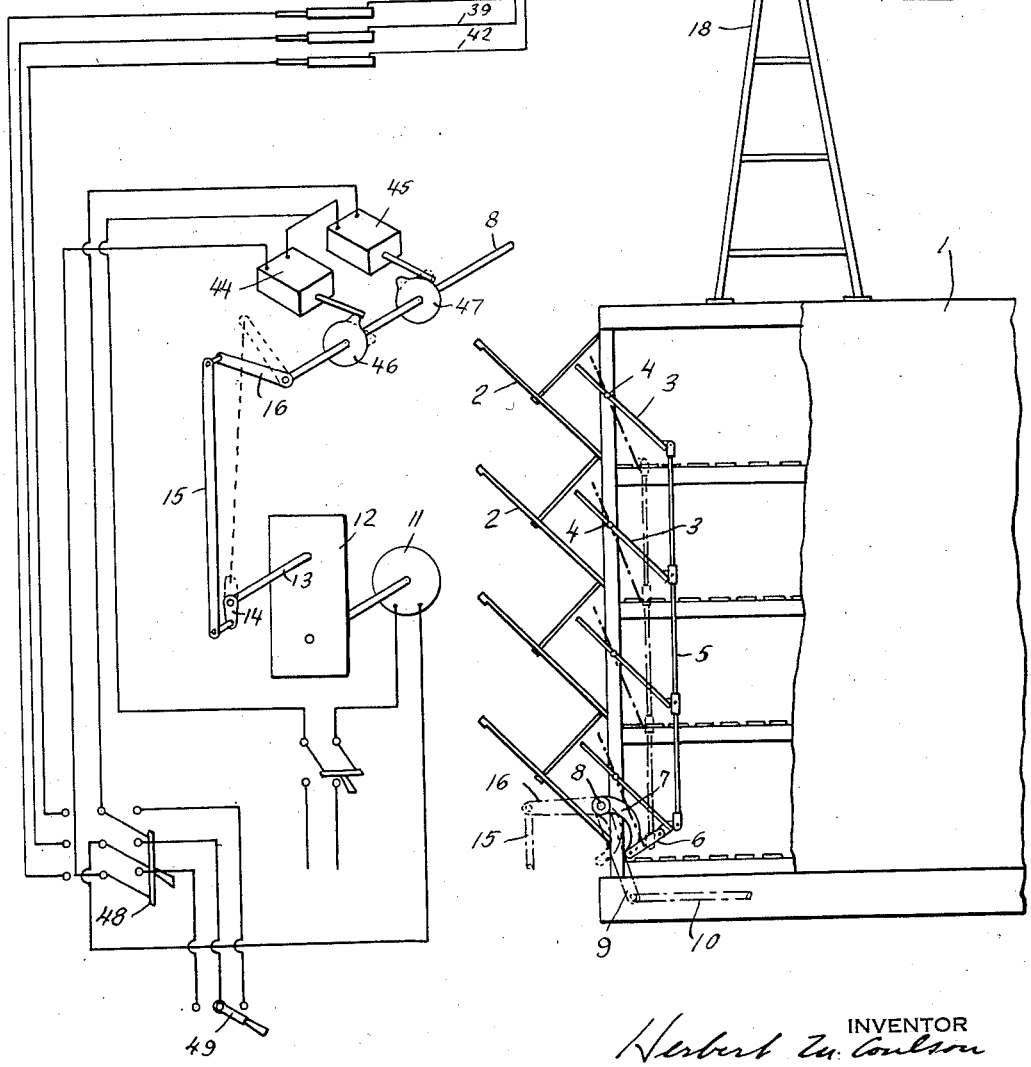
INVENTOR
Herbert M. Coulson
BY
ATTORNEYS Patented Aug. 13, 1935

2,010,980

UNITED STATES PATENT OFFICE 2,010,980

AUTOMATIC SHUTTERS FOR WATER COOLING TOWERS

Herbert M. Coulson, Tulsa, Okla., assignor to Sinclair Prairie Oil Company, a corporation of Maine Application March 29, 1932, Serial No. 601,872

4 Claims. (Cl. 261—109)

This invention relates to automatic adjusting mechanism for changing the position of an adjustable element in accordance with fluid velocity variations. More specifically, it relates to automatic closure operators because the invention deals particularly with the automatic opening and closing of shutters on a water cooling tower in accordance with predetermined changes in the wind velocity.

The cooling compartment of a cooling tower through which water or other liquid to be cooled is sprayed or allowed to fall must be sufficiently open in its construction to permit free enough access of the air to effect the necessary cooling of the water. It often happens that when there is a considerable increase in wind velocity, the free access to the wind permitted by the open construction of the cooling compartment allows the wind to blow the falling water out of the compartment. This is particularly objectionable in districts where water is scarce and where its conservation is of importance.

One of the objects of this invention is to prevent this loss of water when the wind velocity increases. To accomplish this, the cooling compartment of the tower is provided with adjustable shutters which are controlled by a wind vane. The shutters are closed automatically when the wind vane is moved a predetermined amount from its normal position by an increase in the wind velocity and are automatically opened when the wind vane returns to its normal position.

While the mechanism to be hereindescribed was designed particularly for use in connection with a water cooling tower, it has a broader application which gives to the invention a broader object, namely, to provide an improved mechanism for automatically actuating an adjustable element in accordance with variations in the velocity of a fluid medium.

The accompanying drawing shows one embodiment of the invention in its application to a water cooling tower. In the drawing:

Figure 1 is a side elevation of a portion of the cooling compartment of the water cooling tower, a part of the wall being broken away to expose the interior mechanism, and Fig. 2 is a schematic view showing the actuating and controlling devices and their circuit connections.

The cooling compartment of the water tower is represented at 1. Water or other liquid to be cooled is admitted to the upper part of the compartment by the usual means, (not shown in the drawing) and is permitted to fall through the compartment. The usual baffles 2 intercept any water which splashes outside of the compartment and which might otherwise be lost.

According to this invention, the openings in the walls of the cooling compartment are provided with adjustable shutters or louvers 3. The drawing shows one vertical series of such shutters. Each of the shutters is mounted to swing about a horizontal axis 4. A vertical rod 5 interconnects all of the shutters of one vertical series, and when moved longitudinally, either opens or closes all of the shutters simultaneously. The shutter mechanism is connected through a link 6 and an arm 7 to an actuating shaft 8, so that oscillation of the shaft 8 will effect opening and closing of the shutters. The shaft 8 may be interconnected with a similar shaft at the other side of the cooling compartment by suitable connections comprising, for instance, an arm 9 and a link 10. Any number of sets of shutters may be simultaneously operated by interconnecting them in this, or in any other suitable way.

Oscillation of the shaft 8 may be effected by means of an electric motor represented at 11 in Figure 2. The motor is connected through suitable reduction gearing, represented conventionally at 12, to a shaft 13. The shaft 13 has a crank arm 14 which actuates a connecting rod 15. The other end of the rod 15 is pivoted to a crank arm 16 secured to the actuating shaft 8. The crank arm 14 is shorter than the crank arm 16, so that when the arm 14 moves through 180°, the crank arm 16 will be moved less than 180°. Movement of the arm 14 through 180° from the position shown in the drawing will therefore move the arm 16 from the full-line position shown in the drawing to some such position as that represented by dotted lines. Continued rotation of the crank arm 14 will reverse the direction of movement of the arm 16 and return it to its original position. Rotation of the crank arm 14 in one direction will therefore oscillate the crank arm 16. Movement of the crank arm 14 through 180° from the position shown in the drawing will rotate the shaft 8 in a clockwise direction to move the shutters to their closed or partially closed position represented by the dotted lines in Fig. 1. Subsequent movement of the crank arm 14 through the next 180° will rotate the shaft 8 in the opposite direction to open the shutters 3. This opening and closing of the shutters is inaugurated by a wind vane which is responsive to the wind velocity. When it is moved a predetermined distance from its normal position by the wind pressure, it automatically starts the actuating motor to close the shutters. When the shutters are closed, the motor is automatically arrested and the shutters remain closed until the wind vane moves back to its normal position whereupon the motor is again started until the shutters are moved to their open position, at which time the motor is again automatically arrested.

The wind vane is represented at 17 in Figure 1. It may be mounted on a tower 18, positioned on top of the cooling compartment 1. The wind vane is mounted to swing about a horizontal axis 19 located on a rotatable structure 20 to which a rudder 21 is rigidly secured. The rudder keeps the wind vane 17 normal to the direction of the wind at all times, its left hand surface, as viewed in the drawing, being always presented to the wind. Fig. 1 shows the vane 17 in its normal position in which it may abut against an adjustable stop 22 located in front of the vane. The vane is moved by wind pressure to the dotted line position 23 in which it abuts against an adjustable stop 24. The wind vane is connected to a link 25 which is moved longitudinally when the wind vane is actuated by the wind. Fig. 2 shows the rod 25 on an enlarged scale. As the rod 25 reciprocates, it actuates a bell crank lever 26 connected by means of a link 27 to a tiltable double-throw mercury switch 28. An important feature of the invention is that there is a certain amount of play or lost motion between the wind vane 17 and the mercury switch 28. This play may be provided at the connection between the rod 25 and the bell crank lever 26 by allowing the rod 25 to fit loosely in the arm of the bell crank lever 26 and by providing the rod 25 with two shoulders 29 and 30 placed on opposite sides of the arm of the bell crank lever. The shoulders 29 and 30 may be adjustable nuts threaded on to the rod 25. In the normal position of the wind vane 17, the shoulder 30 abuts against the arm of the bell crank lever 26 as shown in Fig. 2. The wind vane may be moved a certain distance from its normal position by the wind pressure before the shoulder 29 comes in contact with the arm of the bell crank lever to effect operation of the mercury switch, and likewise after the wind vane has been moved to its ultimate position by the wind pressure it can be moved back toward its normal position a certain distance before the shoulder 30 comes in contact with the arm of the bell crank lever to effect operation of the mercury switch. The reason for providing this play or lost motion will be made clear later on. The wind vane 17 is returned to its normal position by a coil spring 31 which may be conveniently mounted in co-axial relation with the rod 25. It may react at one end against a stationary abutment 32 and at its other end against a shoulder 33 on the rod 25. The wind pressure must overcome the tension of this spring when it deflects the vane.

The mercury switch 28 is mounted to tilt about a horizontal axis 34. A spring 35 biases the mercury switch to either of its extreme positions. In one position of the switch, an electric circuit is completed by the mercury (when the circuit is otherwise complete) through a pair of contacts 36 and 37 and corresponding conductors 38 and 39. In the other position of the switch, a circuit is likewise completed by the mercury through contacts 40 and 41 and the corresponding conductors 39 and 42. These conductors, being mounted on the rotatable structure 20 on the wind vane tower rotate with it so they are connected with corresponding conductors on the stationary part of the tower through slip rings represented at 43.

Electrically connected with the motor 11 and with the mercury switch 28 in the manner hereinafter described are two limit switches 44 and 45. These switches are mechanically operated by cams 46 and 47, represented in the drawing as being located on the shaft 8.

When the wind vane 17 is in its normal position, the mercury switch 28 is in the position shown in Fig. 2, the limit switch 44 is open and the limit switch 45 is closed. When the wind vane is moved far enough by the wind pressure, the mercury switch 28 will be tilted to its other extreme position. As will be seen by tracing the circuits shown in Fig. 2, this will establish a circuit through the contacts 40 and 41 and the closed limit switch 45 to the electric motor. The electric motor will thereupon rotate the shaft 8 in a clock-wise direction until the cam 47 opens the limit switch 45. This will arrest the electric motor. The parts are so arranged and the cam 47 is so positioned relative to the shaft 8 that the period during which the motor operates is just sufficient to close the shutters 3, and when the parts come to rest the crank arm 14 will be displaced 180° from the position shown in Fig. 2. While the motor was operating to close the shutters, the cam 46 moved to the dotted line position shown in Fig. 2 to close or reset the limit switch 44 (this switch having been opened during a previous cycle to arrest the electric motor). The resetting of the limit switch 44 places it in condition to allow the motor to operate when this limit switch is selected by the mercury switch during the next cycle of operations. When the wind pressure recedes, the wind vane is moved back to its normal position by the coil spring 31. This will tilt the mercury switch 28 back to the position shown in Fig. 2 to establish an electric circuit through the motor 11 and through the limit switch 44. The shutters will now open because further rotation of the crank arm 14 rotates the shaft 8 in an anticlock-wise direction. When the shutters reach their open position, the cam 46 opens the limit switch 44 to arrest operation of the motor and the cam 47 will close the limit switch 45. The parts are then in the position shown in the drawing.

It may sometimes be desirable to start the electric motor 11 by hand to effect opening or closing of the shutters. This may be accomplished by inserting a double-throw, three-pole switch 48 in the circuit in such a way that in one position (the left hand position as viewed in the drawing) it establishes the circuits so as to render the mercury switch 28 effective for controlling the shutters and in the other position (the right hand position as viewed in the drawing) it cuts the mercury switch out of circuit and substitutes in its place a double-throw hand switch 49. In one position, the hand switch 49 starts the motor 11 and establishes a circuit through one of the limit switches and in its other position it likewise starts the motor and establishes a circuit through the other limit switch. The same result is therefore accomplished by the switch 49 as is accomplished by the mercury switch 28 except that in the case of the switch 49 the control is by hand whereas as in the case of the mercury switch 28 the operation is accomplished automatically by the wind vane.

It will now be seen that when the wind velocity increases to a point where the water passing through the cooling compartment is in danger of being blown out of it, the wind vane operates to close the shutters an amount which will prevent this from taking place. When the wind velocity subsides, the wind vane returns to its normal position and the shutters are automatically opened. It should be particularly noted that slight variations in the wind velocity will not cause the shutters to open or close. An increase in wind velocity up to a certain point may do no harm and therefore the wind vane is permitted a certain amount of movement from its normal position without causing the shutters to close. This is accomplished through the lost motion connection between the rod 25 and the bell crank lever 26. Likewise, after the wind vane has been moved to its extreme position by the wind pressure and has closed the shutters, the wind velocity may subside a certain amount without causing the shutters to open. It is only after the wind velocity subsides a predetermined amount that the shoulder 30 will come in contact with the bell crank lever 26 to cause the shutters to open. A certain amount of variation in the wind velocity may therefore take place without operating the shutters and the only effect of this variation will be to cause the wind vane 17 to move back and forth without starting the motor. When these variations exceed a predetermined amount, the shutters will be operated in the manner hereinbefore described.

So far as the broader application of the invention is concerned, the shutters correspond with any adjustable element whose position it is desired to change, and the fluid whose pressure variations effect movement of such element may be some fluid other than air.

I claim:—

1. The combination with an adjustable element capable of movement to several positions of a motor and means mechanically connecting said motor with said element for moving said element to said positions, a member responsive to variations in fluid velocity and mounted for movement to two controlling positions, means adapted to maintain said member in a position normal to the direction of fluid flow and means brought into operation upon movement of said member to either of said controlling positions for starting said motor and then stopping it after a predetermined movement of said adjustable element.

2. The combination with an adjustable element capable of movement to several positions, of an electric motor mechanically connected with said element for moving it to said positions, a member responsive to variations in fluid velocity and mounted for movement to two controlling positions, a double-throw switch mechanically connected with said member for actuation thereby, said switch being electrically connected with said motor to establish a circuit thereto in either position of the switch, and a pair of limit switches electrically connected with said double-throw switch and the electric motor so that one will be included in and the other excluded from the motor circuit in each position of said double-throw switch, and means operable during rotation of the motor for opening the included limit switch and for closing the excluded limit switch after a predetermined movement of said adjustable element.

3. A control system for actuating an adjustable element in accordance with predetermined velocity changes in a fluid comprising an electric actuating motor mechanically connected with the adjustable element, an electric circuit for the motor, a movable governing member responsive to changes in the velocity of the fluid, a selector switch movable to two circuit closing positions by said governing member, a pair of limit switches for the motor electrically connected with the selector switch and the motor so as to be selectively placed in the motor circuit by movement of the selector switch to one of its circuit-closing positions, and means actuated by the motor and operable after a predetermined movement of the adjustable element to open that limit switch which is in the circuit of the motor and to close the other limit switch preparatory to its subsequent inclusion in the motor circuit upon its selection by the next movement of the selector switch.

4. A control system for actuating an adjustable element in accordance with predetermined velocity changes in a fluid, comprising actuating means for the adjustable element, a movable governing member responsive to changes in the velocity of the fluid, and mechanism whereby predetermined movement of said governing member controls said actuating means comprising means mechanically connected with the governing member for movement thereby to effect starting of said actuating means, and a pair of arresting devices mechanically connected with the actuating means for operation thereby, each of said arresting devices being capable in one position of arresting operation of the actuating means and in another position of allowing operation thereof, one of said arresting devices being moved to its arresting position during operation of the actuating means to arrest its operation after a predetermined movement of the adjustable element and the other arresting device being simultaneously reset to its non-arresting position.

HERBERT M. COULSON.